July 31, 1928.
L. H. SHIPMAN
SOLAR HEAT DRIER
Filed May 6, 1925
1,678,711
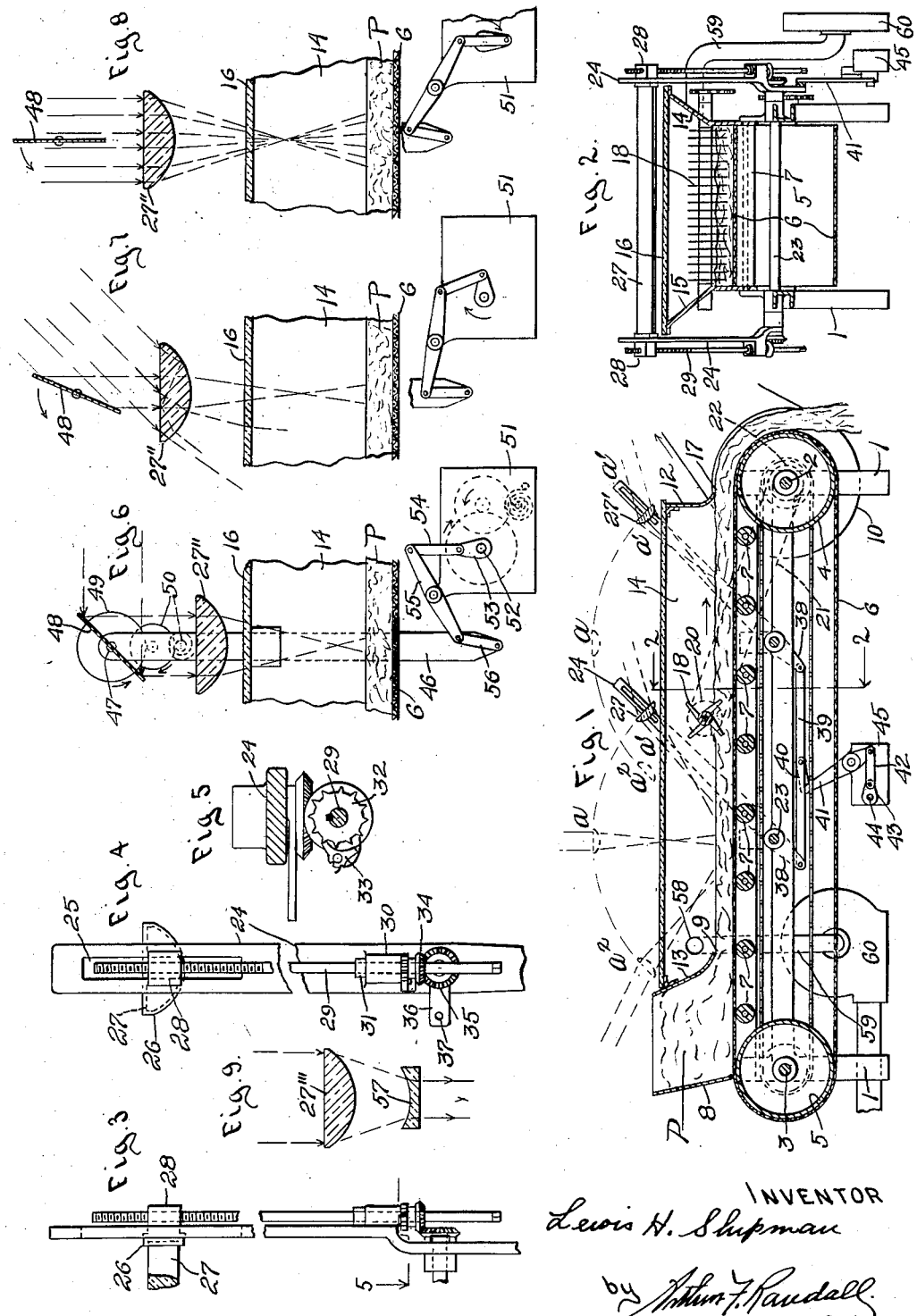
INVENTOR
Lewis H. Shipman
by Arthur F. Randall
Att'y Patented July 31, 1928.

1,678,711

UNITED STATES PATENT OFFICE.

LEWIS H. SHIPMAN, OF BOSTON, MASSACHUSETTS.

SOLAR-HEAT DRIER.

Application filed May 6, 1925. Serial No. 28,400.

My invention relates to driers and particularly to a drier for peat, fruit, and like material, which utilizes heat derived from the sun's rays.

My improved drier comprises an endless traveling conveyer upon which is deposited the material to be dried, and adjacent the path of said conveyer is disposed means for concentrating the solar rays upon the material on the conveyer, said material being carried past said means from a loading position to a position where it is removed from the conveyer. In the best form of my invention the traveling conveyer constitutes the bottom wall of a housing that incloses the material carried by the conveyer, said housing having a top wall made of glass or other suitable transparent material through which the sun light is free to pass.

Another feature of my invention, in its best form, resides in the combination with the traveling conveyer, of a lens for directing a beam of condensed solar rays upon the material that is supported by the conveyer, said lens being adjustable so that it may be maintained in effective position between the sun and the material on the conveyer throughout the day. Preferably automatic orientating means is provided for adjusting the lens in this fashion.

Other features of my invention are hereinafter pointed out.

In the accompanying drawings:

Figure 1 is a longitudinal sectional view of a drier constructed in accordance with my invention.

Figure 2 is a section on line 2—2 of Fig. 1.

Figures 3, 4 and 5 are details relating to the lens supporting means of the apparatus shown in Fig. 1.

Figures 6, 7 and 8 are elevations, partly in section and more or less diagrammatic, illustrating a modification.

Figure 9 is a detail illustrating another modification.

My improved drier, as herein shown, comprises a frame 1 on which are journaled two shafts 2 and 3, one near each end thereof, said shafts carrying drums or rolls 4 and 5, respectively, which support an endless flexible conveyer belt 6 made from woven wire fabric, or other suitable porous material. The upper horizontal stretch of belt 6 receives upon it the peat or the like that is to be dried, and this stretch is supported, intermediate the drums 4 and 5, by a series of smaller rollers 7 whose shafts are journaled on frame 1.

Above the upper stretch of conveyer 6 and near one end thereof is a hopper 8 for holding a supply of peat or the like, the latter being delivered from the hopper on to the conveyer by gravity and one wall of the hopper being made with an outlet opening 9 through which the peat is carried by the movement of the conveyer in the direction indicated by the arrow in Fig. 1. The shaft 2 of the drum 4 carries a pulley 10 connected by a belt with a source of power through which the conveyer is driven in the direction indicated.

The top stretch of conveyer 6 constitutes the bottom wall of a housing that incloses the peat on the conveyer while it travels from the hopper 8 to the drum 4, and this housing is completed by end walls 12, and 13, two outwardly inclined side walls 14 and 15 and a top wall 16, the latter being made from glass or other suitable transparent material, and all of these walls being part of, or supported by, the frame 1. The end wall 12 is made, adjacent drum 4, with an outlet opening 17 for the peat. The peat enters the housing from the hopper through the passage 9 and during its travel through the housing it is subjected to the drying action of the heat of the sun's rays. After leaving the housing at exit 17 it is discharged by gravity from the conveyer as the latter makes its turn around the drum 4, as shown in Fig. 1.

Within the housing is arranged a rotatable beater 18 whose shaft is journaled in bearings on side walls 14 and 15 and carries, outside the housing, a pulley 20 driven through a belt 21 by a pulley 22 fast on the shaft 2 of drum 4. This beater serves to turn the peat on conveyer 6 over after the top portion thereof has been subjected to the action of the sun's rays for a period of time.

At a point intermediate beater 18 and hopper 8 is a transverse shaft 23 journaled in bearings on frame 1, said shaft having fast thereon, outside of the housing, two upwardly extending arms 24, each formed near its upper end with a longitudinal slot 25, Figs. 3 and 4, within which is slidably mounted a bracket 26, these two brackets being attached rigidly to the opposite ends of a transversely disposed plano-convex-cylindrical lens 27 supported in position above the housing by the arms 24. Each bracket 26 is made, outside of its arm 24, with a lug 28 formed with a threaded hole through it to receive the upper end of a screw threaded rod or shaft 29. Near its lower end the shaft 29 is journaled in a bearing lug 30 provided upon the outer side of its arm and has fixed on it a collar 31 that is seated upon said lug. Fast on shaft 29, just below lug 30, is a ratchet wheel 32, Figs. 4 and 5, engaged by a reversible spring pressed pawl 33 carried by an arm projecting from the hub of a gear 34. The gear 34 is in mesh with a stationarily supported gear 35 that is loosely mounted on the end of shaft 23 but held against rotation therewith by an arm 36 projecting from the hub thereof and fastened at 37 to the frame of the machine.

In the embodiment of my invention herein illustrated I have shown a second lens $27^1$ disposed above the conveyer 6 and the housing intermediate the beater or stirrer 18 and the outlet end of the housing, said lens $27^1$ being likewise supported by a swinging lens support including another shaft 23 journaled on the main frame 1.

Arms 38 projecting downwardly from the pivoted lens supports are joined by a connecting bar 39 connected through a link 40, lever 41, link 42 and arm 43 with the shaft 44 of a clock mechanism 45, said shaft making one revolution every twenty-four hours. This clock mechanism acts through the connections just described to vibrate the pivoted lens supports once every twenty four hours and is timed so that at midday the two lenses 27 and $27^1$ occupy intermediate positions $a$, $a$; at sun-set they occupy the positions $a^1$, $a^1$ and at sun-rise they occupy the positions $a^2$, $a^2$. The apparatus is placed in position where its conveyer 6 extends east and west and preferably with its material receiving end toward the west. Thus it will be seen that throughout the day the two lenses will be outomatically maintained in effective position between the sun and the material upon the conveyer 6 and each will operate to direct onto said material a condensed beam of solar rays, the material being first subjected to the action of the beam from lens 27; then turned over by the beater or stirrer 18 and then subjected to the action of the beam from lens $27^1$ after which it is discharged by gravity from the conveyer as the latter makes its turn around drum 4.

A disclosure of a mechanism capable of being adapted to the actuation of shaft 44, and also of the shafts 47 and 52 hereinafter referred to, is found in chapter 9, page 311, of "Annals of the Astrophysical Observatory" printed by the Government Printing Office in 1922 and issued by the U. S. Smithsonian Institution.

It will be apparent that during each vibratory movement of each lens support the gear 34 is rolled around the stationary gear 35 and as a result the pawl carrying arm projecting from gear 34 is vibrated with the result that pawl 33 imparts to ratchet 32 and screw 29 a rotative step movement and this movement of the screw adjusts the lens toward or from the conveyer a predetermined distance according to the setting of the reversible pawl 33. This mechanism, the use of which is optional, is herein utilized to position the lens nearest the conveyer in the spring and to adjust the lens away from the conveyer as the season progresses to midsummer. At mid-summer the pawl 33 is manually or otherwise reversed after which the mechanism acts to shift the lens toward the conveyer as the season progresses.

In Figs. 6, 7 and 8 I have shown a modification wherein each lens, as $27''$, is fixed at its end to an upright bar 46 mounted upon the frame of the machine. At its upper end the bar 46 carries a shaft or trunnion 47 to which is secured one end of a reflector 48 which may be made of the same width and length as the lens $27''$. Shaft 47 carries a gear 49 through which it is connected with, and rotated once in forty-eight hours by, a clock mechanism 50. Both sides of reflector 48 are mirrors and the movement of said reflector is timed so that at sun-rise it occupies the position shown in Fig. 6; at mid-day the position shown in Fig. 8 and at sun-set a position ninety degrees from that shown in Fig. 6. It will thus be clear that with this form of my invention only the mirror 48 is adjusted angularly to follow the movement of the sun and that said mirror serves to reflect a beam of rays through lens $27''$ in a direction perpendicular to the plane side thereof.

It may be desirable in some instances to mount the bar 46 in vertical ways on the frame of the machine and to adjust the bar and lens away from the material as the forenoon progresses and toward the material as the afternoon progresses. As herein shown I have provided a clock mechanism 51 for automatically effecting this adjustment, said mechainsm having a shaft 52 making one revolution every twenty-four hours and connected with the lower end of bar 46 through an arm 53 fast on shaft 52; a link 54; lever 55 and link 56.

As shown in Fig. 9 the condensing lens as $27''''$ may be associated with a plano-concavo cylindrical lens 57 located between said lens and its focal point, or rather line. This construction is not used in combination with the means for shifting the lens toward and from the material.

In order to remove from the interior of housing 14—15—16 the vapor laden air and substitute drier air I provide an outlet 58 connected by a pipe 59 with an exhausting fan 60 which latter may be operated continuously as shown, or intermittently, the air removed from the housing by the fan being replaced by air entering said housing through the porous conveyer and peat and at the outlet 17.

What I claim is:

1. A solar heat drier for peat and the like having, in combination, an endless traveling conveyer belt on to which the peat or the like is delivered; a housing through which the peat or the like is transported by said conveyer, said housing inclosing the peat on all sides and having a transparent top; an air outlet communicating with the interior of said housing; means for exhausting air through said outlet and substituting fresh air therefor, and means for directing a beam of condensed solar rays on to the peat upon the conveyer while moving through said housing.

2. A solar heat drier for peat and the like constructed in accordance with claim 1 and wherein said beam directing means consist of a lens.

3. A solar heat drier for peat and the like constructed in accordance with claim 1 wherein the beam directing means is an adjustable lens and orientating means is provided for said lens.

4. A solar heat drier for peat and the like having, in combination, an endless traveling conveyer; a hopper from which the peat or the like is delivered on to said conveyer; means including a lens supported in position above said conveyer for directing a beam of condensed solar rays on to the material supported by and moving with the conveyer; automatic means for adjusting said beams directing means in accordance with the movement of the sun during the day; a housing inclosing the peat or the like upon the conveyer; said housing having a transparent top wall, and an automatically operated stirrer member within said housing.

LEWIS H. SHIPMAN.